(12) United States Patent
Ertugrul et al.

(10) Patent No.: US 11,432,905 B2
(45) Date of Patent: Sep. 6, 2022

(54) DENTAL HAND PIECE

(71) Applicant: DENTSPLY SIRONA inc., York, PA (US)

(72) Inventors: Metin Ertugrul, Rodermark (DE); Stefan Gobel, Langen (DE)

(73) Assignee: DENTSPLY SIRONA INC., York, PA (US)

( * ) Notice: Subject to any disclaimer, the term of this patent is extended or adjusted under 35 U.S.C. 154(b) by 0 days.

(21) Appl. No.: 16/031,204

(22) Filed: Jul. 10, 2018

(65) Prior Publication Data

US 2019/0029774 A1 Jan. 31, 2019

(51) Int. Cl.
*A61C 1/12* (2006.01)
*A61C 1/18* (2006.01)
*A61C 1/06* (2006.01)

(52) U.S. Cl.
CPC ............... *A61C 1/12* (2013.01); *A61C 1/185* (2013.01); *A61C 1/06* (2013.01)

(58) Field of Classification Search
CPC .... A61C 1/12; A61C 1/08; A61C 1/06; A61C 1/185; A61C 1/16; A61C 1/10; A61C 1/07; A61C 1/181; A61C 1/183; A61B 2017/00477; A61B 2017/0046
See application file for complete search history.

(56) References Cited

U.S. PATENT DOCUMENTS

| | | | | |
|---|---|---|---|---|
| 4,255,143 | A * | 3/1981 | Schuss ..................... | A61C 1/18 403/316 |
| 4,278,429 | A * | 7/1981 | Straihammer ........... | A61C 1/10 433/105 |
| 4,303,392 | A * | 12/1981 | Rollofson ................ | A61C 1/18 285/337 |
| 4,354,839 | A * | 10/1982 | Schuss ..................... | A61C 1/18 433/126 |
| 4,614,498 | A * | 9/1986 | Vaccaro .................. | A61C 1/088 433/126 |
| 4,681,540 | A * | 7/1987 | Landgraf ................. | A61C 1/06 422/131 |
| 4,753,595 | A * | 6/1988 | Schuss .................... | A61C 1/088 433/133 |
| 4,792,304 | A * | 12/1988 | Schuss .................... | A61C 1/08 433/126 |
| 4,983,121 | A |  1/1991 | Straihammer | |
| 7,179,087 | B2 * | 2/2007 | Kuhn ....................... | A61C 1/18 433/114 |
| 2004/0014000 | A1 * | 1/2004 | Bernhard ................. | A61C 1/18 433/82 |

* cited by examiner

*Primary Examiner* — Jacqueline T Johanas
*Assistant Examiner* — Shannel Nicole Belk
(74) *Attorney, Agent, or Firm* — Dentsply Sirona Inc.

(57) ABSTRACT

Dental hand piece, comprising a housing and a drive train with a coupling element for a drive, wherein the housing radially surrounds the drive train and wherein the housing has a first and a second housing end, and wherein the housing is held on the drive train on the first and on the second housing end. Between the first housing end and the coupling element is arranged a decoupling element, which is strictly springy or springy and damping in the axial direction, whereas the second housing end is braced rigidly against the drive train and the housing is braced with respect to the coupling element in the axial direction by means of the decoupling element.

10 Claims, 3 Drawing Sheets

DENTAL HAND PIECE

The present disclosure relates to a dental hand piece, in particular, a contra-angle hand piece; and, in particular, to the design of such a dental instrument in the area of a coupling end with a drive. Dental instruments have the task of driving a tool, secured in the head region, at high speed. In so doing, the rotating components of dental instruments generate vibrations that are emitted through the outside of the dental instrument. These vibrations can be amplified or attenuated as a function of the embodiment.

PRIOR ART

The prior art discloses a variety of approaches, the objective of which is to reduce noise emissions. For example, it is possible to counteract the generation of vibrations by optimizing the mounting of the rotating parts. Even an increase in the mass, in particular an outer sleeve, can reduce the vibration amplitudes and thus result in a noise reduction.

A dental hand piece known from the document EP 0 282 752 A1 comprises a tool that can be driven by an electric motor at high speed. The hand piece comprises a housing in the form of a grip sleeve with a coupling region, in which a coupling element for the drive and a neck assembly and a head assembly are disposed, with said coupling element, said neck assembly and said head assembly being permanently connected to one another to form a base body, wherein the grip sleeve radially envelops the base body and is fixed to said base body by means of its housing ends.

In order to minimize the vibrations and running noises, an elastic element is arranged centrally and at both ends, respectively, between a grip sleeve and a base body with a coupling element. In this case an internal coupling element is releasably connected to an external sleeve by means of a connecting element. This connecting element clamps the two parts together and, in so doing, provides for a stable connection. The grip sleeve constitutes a resonance body, which is clamped to a greater or lesser extent as a function of the embodiment. If the coupling piece is connected to the grip sleeve in a comparatively rigid manner, then the vibrations and thus the noise emissions are intensified by the grip sleeve as a result. Therefore, the grip sleeve may be mounted in a floating manner with respect to the base body, instead of being rigidly clamped by means of a threaded ring in contact with the base body. The grip sleeve and the base body are kept apart in the radial direction by means of the elastic element, which is designed as an O-ring, on the rearwards area of the hand piece. In the axial direction the grip sleeve is fixed in a floating manner with respect to the base body by means of the elastic shaped part that is disposed approximately in the middle. The drawback with this floating mounting is that the central and end-sided arrangement is highly complex in design.

It is disclosed as an alternative embodiment that elastic elements are provided only on the ends of the grip sleeve; however, these elastic elements do not allow a definite axial fixing between the base body and the grip sleeve.

SUMMARY

According to the present disclosure, the dental hand piece comprises a housing and a drive train with a coupling element for a drive. The housing radially surrounds the drive train and has a first and a second housing end and is held on the drive train by means of the first and the second housing end. Between the first housing end and the coupling element there is arranged a decoupling element, which is strictly springy or springy and damping in the axial direction, whereas the second housing end is braced rigidly against the drive train. The housing is braced with respect to the coupling element in the axial direction by means of the decoupling element.

The hand piece may be, in particular, a contra-angle hand piece. The hand piece may comprise a tool holder for a tool, which can be driven at high speed.

In the case of this hand piece a rigid coupling of the housing to the coupling element is prevented, the design being characterized in particular by its simplicity and effectiveness. It has been found to be sufficient if the vibrations that are introduced by way of the head are damped by means of a resilient decoupling element in the coupling region and if the axial bracing of the housing, which can also be designed as an outer sleeve, is reduced in comparison to a rigid mounting.

The provision of a resilient releasable connection by means of a strictly springy element or a springy and damping element between the housing and the coupling element in the axial direction, instead of a rigid, releasable connection, requires only a small amount of installation space, and just a few additional single components are necessary. The design is simple in construction, inexpensive in terms of implementation, robust in operation and user friendly in terms of maintenance and repair, while being highly effective at the same time.

In this case the lowest eigenfrequencies of the housing are below the audibly perceivable oscillation frequencies generated in the instrument, so that an increase in the amplitude due to the resonance is avoided. In addition, the housing is not clamped by a resilient connection, an aspect that has a positive effect on the oscillatory characteristics of the housing, since the past modes of vibration no longer occur owing to the modified connection of the housing.

If the decoupling element is designed as a damping part, which an O-ring made of an elastomer material, for example, would constitute, it is also possible to damp the vibrations in the housing, where in this case the vibrations are generated in other areas of the instrument, such as, for example, the head region and are then introduced into the housing through a rigid connection in the head region.

The drive train may advantageously comprise a head and neck assembly, wherein the head assembly is angled with respect to the coupling element, and the head assembly may comprise a tool axis, which in turn can be angled with respect to the head assembly, wherein the coupling element is permanently connected to the head assembly by means of a U-bolt; and this head assembly is rigidly braced against the housing by means of a stop. In this way a contra-angle hand piece can be provided.

The decoupling element can be advantageously pressed in the axial direction against a support surface, which is in particular perpendicular to the axial direction, but at least inclined, in order to absorb the axial forces by means of an at least partial form fit.

Advantageously, the housing may comprise a support ring and the coupling element may comprise a coupling cover, and the decoupling element may be disposed between the support ring and the coupling cover.

Existing components, such as the housing or the coupling element, may be easily replaced with such an arrangement.

The decoupling element in the material compound may be formed advantageously with a support ring for attaching to the housing and with a coupling cover for attaching to the coupling element. In this case the decoupling element is disposed between the support ring and the coupling cover. A component that can be handled as one piece is created with such an embodiment.

BRIEF DESCRIPTION OF THE DRAWINGS

One exemplary embodiment of the present invention is shown in the drawings. The drawings show in.

DETAILED DESCRIPTION

Figure 1:
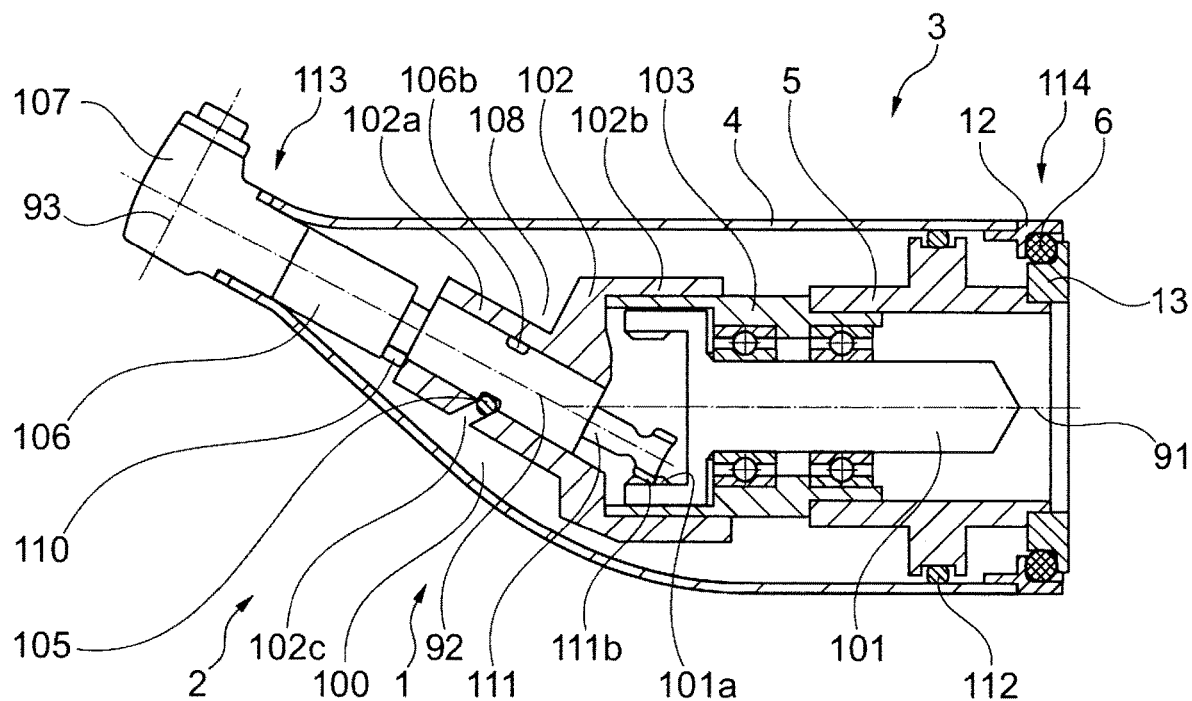
FIG. 1 a longitudinal section of a dental hand piece.

FIG. 1 shows a dental instrument 1, which is designed as a hand piece and in particular as a contra-angle hand piece. The hand piece 1 comprises a head region 2 with a rotating tool 20 and a coupling region 3 as well as a housing 4, designed as an outer sleeve. The coupling region 3 extends typically over a length of approximately 30% in comparison to the total length of the hand piece 1.

On the first housing end, located in the coupling region 3, there is provided a coupling element 5, which is designed to be connected to a drive (not shown) and which is braced with respect to the housing 4 by means of a decoupling element 6.

Figure 2:
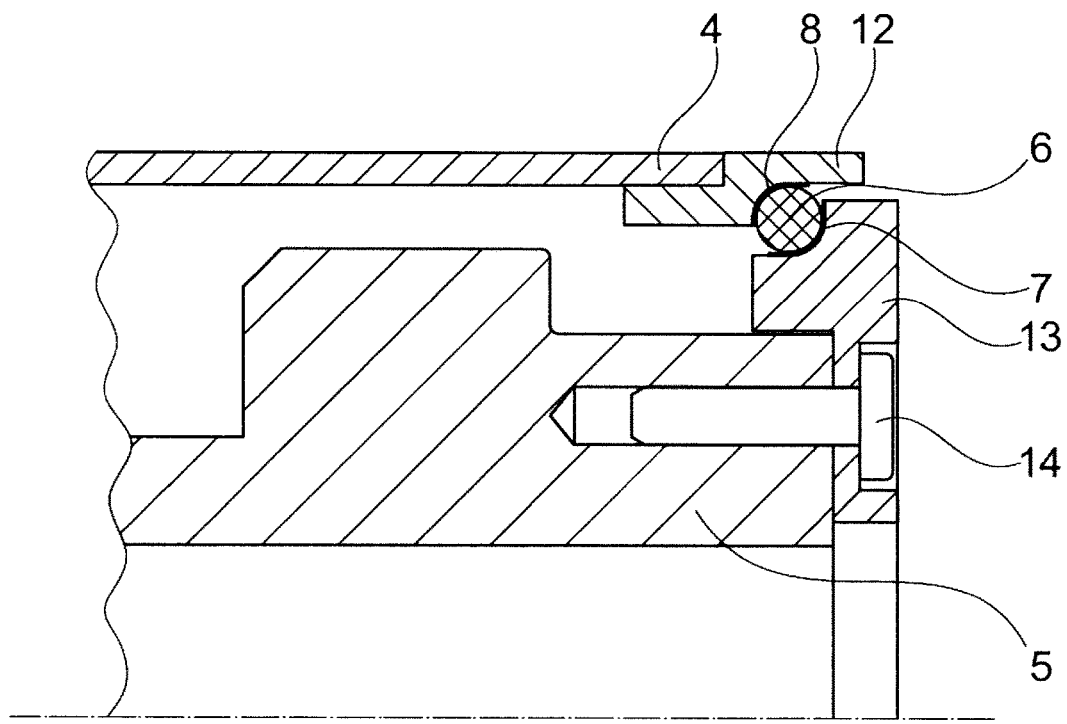
FIG. 2 a detail in a coupling region of the hand piece from FIG. 1.

As shown in detail in FIG. 2, the decoupling element 6 is disposed between a first axial support surface 7 and a second axial support surface 8, wherein the first axial support surface 7 is located on a support ring 12 connected to the outer sleeve, and the second axial support surface 8 is located on a coupling cover 13. The coupling cover 13 is attached to the coupling element 5 by means of a fixing screw 14 and other screws (not shown), which are distributed over the periphery, and presses the coupling cover 13 against the coupling element 5. In this way the decoupling element 6 is pressed with the support surface 7 on the coupling cover 13 against the support surface 8 of the support ring 12. In this case the support ring 12 is attached centrally in the outer sleeve 4 with little play or even with a slight radial compression.

Figure 3:
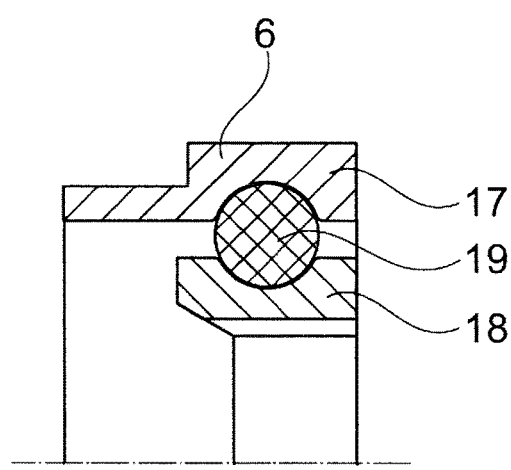
FIG. 3 an alternative embodiment of the hand piece shown in FIG. 1, with a decoupling element in a material compound.

FIG. 3 an embodiment of a decoupling element 6 is shown as a material compound, which consists of a support ring 17, a coupling cover 18 and a spring and damping element 19. The decoupling element 6 can be injection molded together with the two separate parts: support ring 17 and coupling cover 18. These two separate parts are usually made of steel, but can also be made of a rigid plastic, such as, for example, PEEK (polyether ether ketone).

A material that may be considered for the spring and damping element 19 is, for example, a FKM (fluorocarbon rubber).

Figure 4:
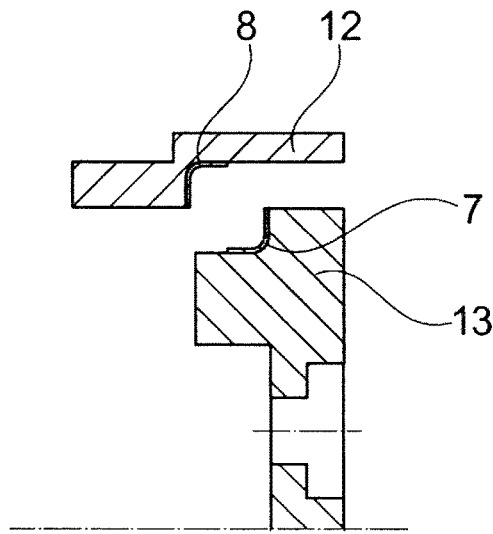
FIG. 4 an embodiment of a receptacle for the decoupling element from FIG. 1 in detail.
Figure 5A:
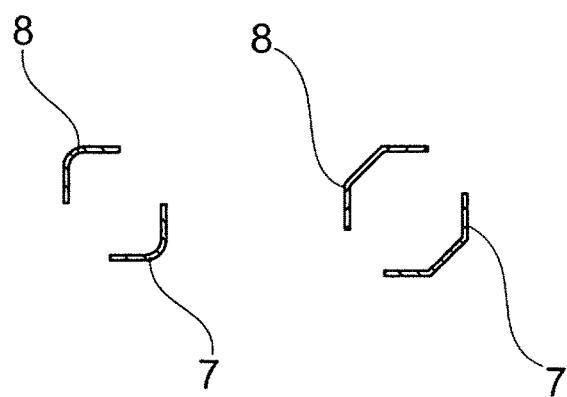
FIGS. 5A-D various embodiments of receptacles for the decoupling element from FIG. 4 in a comparison.
Figure 5B:
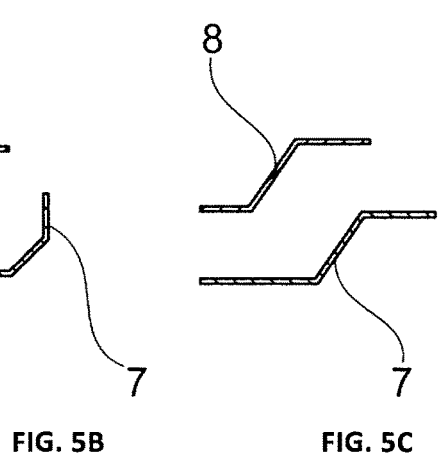
Figure 5C:
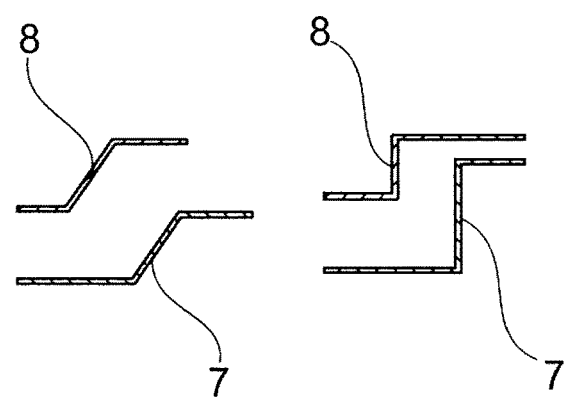
Figure 5D:
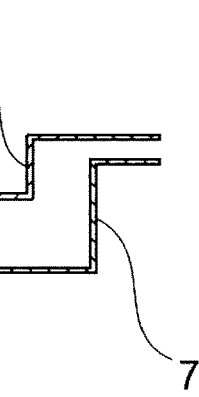

FIG. 4 shows a detail of an embodiment of a receptacle for the decoupling element from FIGS. 1 and 2; and various embodiments of receptacles for the decoupling element are explained in conjunction with FIGS. 5A to D. The receptacles have different shapes for the support surfaces 7 and 8. As a result, the support surfaces 7 and 8 may be rounded (FIG. 5A); may be a vertical surface with a bevel (FIG. 5B); may be designed completely as a bevel (FIG. 5C) or completely as a strictly axial surface (FIG. 5D).

The decoupling element 6 may be made of a plastic or a metal material. In this case the important aspect is that said decoupling element exhibits at least elastically deformable properties. It is advantageous for the decoupling element 6 to exhibit an elastically plastic property. It is particularly advantageous if the decoupling element 6 also exhibits springy and damping properties.

The decoupling element 6 may be an O-ring made of a material, such as a FKM (fluorocarbon rubber) that is particularly able to withstand thermal and chemical sterilization. In order to achieve the maximum possible damping, a material that is as soft as possible may be used. Typical Shore hardnesses are Shore 60, Shore 70 and Shore 80.

In this context it is important that the decoupling element 6 can be pressed in the axial direction of the central axis against a vertical surface or a surface that is tilted at least towards the central axis, in order to achieve more than a strictly radial installation of an O-ring known from the prior art.

In addition, it is important to ensure that the decoupling element 6, for example an O-ring or O-rings, is always uniformly clamped.

The embodiment of a hand piece as a contra-angle hand piece is explained in greater detail with reference to FIG. 1. Starting from a first axis 91, which corresponds to the axis of a drive shaft 101 or a motor axis and is also referred to as the central axis or the 0° axis, a second axis, for example, a neck shaft 111 is at an angle of 18° to the central axis or the motor axis 91. Following this 18° axis 92 is a third axis 93, which corresponds, for example, to the central axis of a head shaft and which is at an angle of 90° to the axis 92 of the neck shaft 111.

A drive train 100, i.e., the hand piece without the housing 4, also comprises a head and neck assembly 107, 108. The inner components of the head assembly 107 are of no importance for the present disclosure. The drive train 100 comprises an angled element 102, which is formed by two sections, i.e., by an angled element section 102a on the side of the second axis 92 and by an angled element section 102b on the side of the first axis 91. The angled element 102 has a recess 102c and is connected to a bearing flange 103 on the side of the first axis 91. The angled element 102, the bearing flange 103 and a guide tube 106 are clamped to one another by means of a U-bolt 105. For this purpose, the guide tube 106 has a recess 106b for the U-bolt 105 and a recess 106a for a stop ring 110. The head assembly is axially fixed on the angled element 102 with the stop ring 110 along the axis 92.

The stop ring 110 has exclusively the function of ensuring that the head assembly 101 is precisely positioned on the axis 92 in the angled element 102.

The head assembly 107 has only the stop ring 110 as an axial boundary. In this way it is ensured that the gear tooth system 111b is always in optimal engagement with the gear tooth system of the ring gear 101a.

In the guide tube 106 the neck shaft 111 is guided with a gear tooth system 111b, which interacts with a gear tooth system 101a of the drive shaft 101, which is mounted in the bearing flange 103.

The outer sleeve 4 rigidly abuts the head assembly 107 by means of a stop 113 and is mounted by means of a stop 114 on the coupling side 3 in the axial direction in a strictly springy or springy and damping manner. In this case an elastic radial spacer 112 may be also provided, in addition or at the same time, in the coupling region 3 on the coupling element 5, in order to prevent the metal parts from coming into contact with one another.

From the coupling element 5 for a drive, the neck assembly 108 and the head assembly 107, a base body is created through their rigid connection; and the housing radially surrounds said base body, to which the housing is attached by means of its two housing ends. In this respect it is important that in the region of the coupling element 3 there are no rigid connections between the outer sleeve 4 and the coupling element 5.

Figure 6:
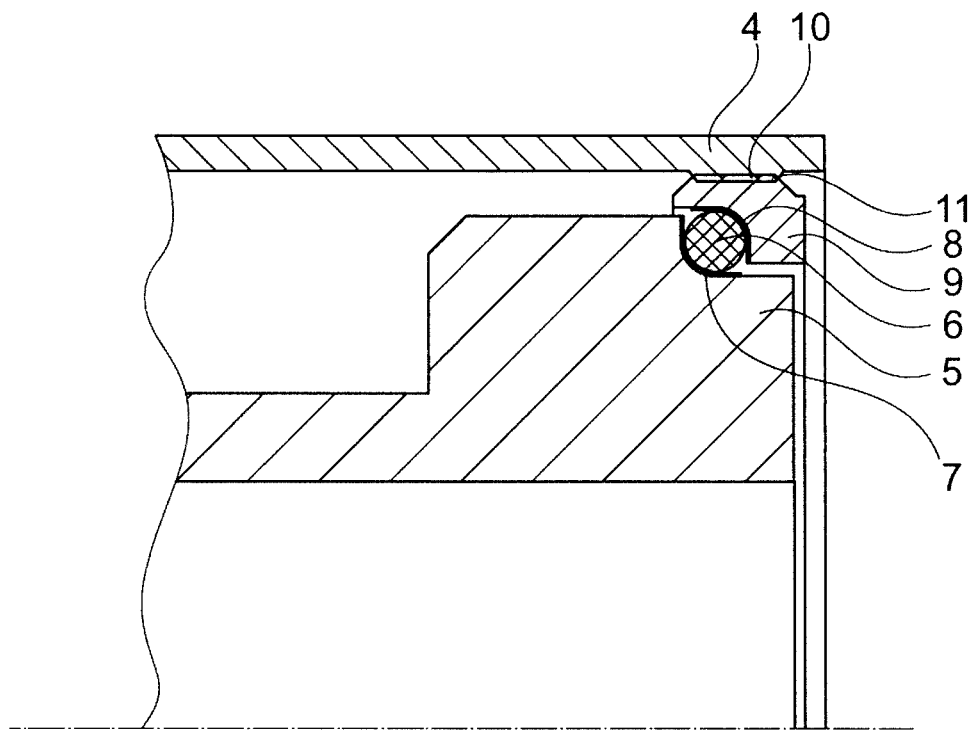
FIG. 6 an embodiment with a decoupling element, which is clamped in the outer housing by means of a threaded ring.

In one exemplary embodiment in accordance with FIG. 6, the decoupling element 6 is pressed against the support surface 7 of the coupling element 5 by means of a threaded ring 9 with a support surface 8. The threaded ring 9 is tightened on the outer sleeve 4 by means of the screw thread 11 and 10. The thread 10 is affixed directly in the outer sleeve 4, and in this case the threaded ring 9 has an external thread. It is possible to dispense with fixing screws.

Figure 7:
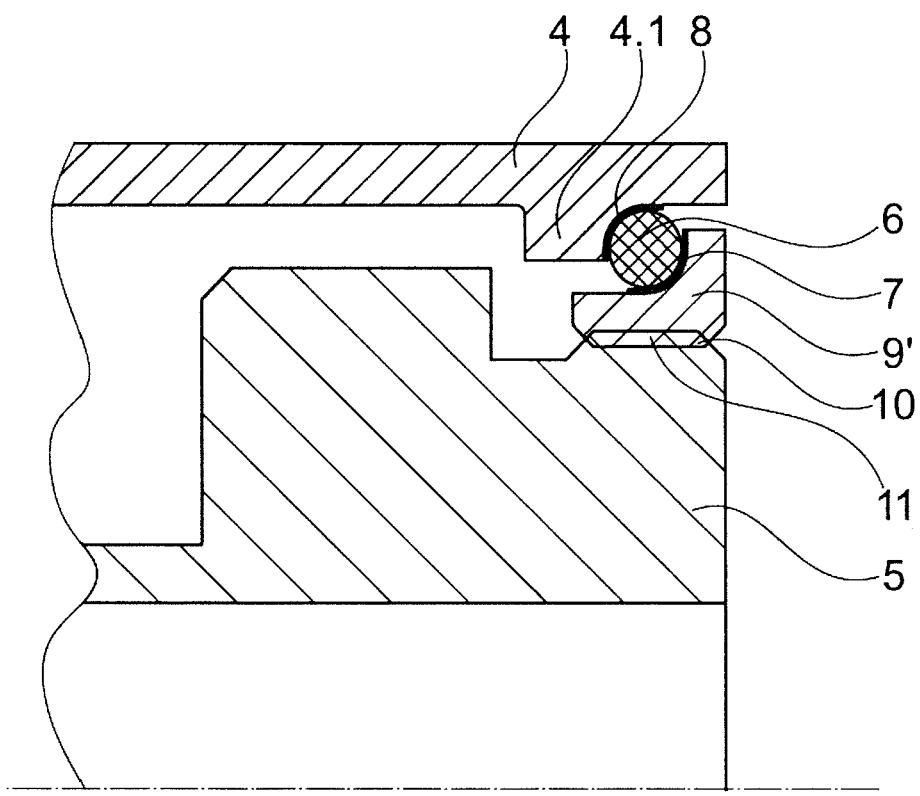
FIG. 7 an embodiment with a decoupling element, which is clamped on the coupling cover by means of a nut.

In an exemplary embodiment in accordance with FIG. 7, the decoupling element 6 is pressed against a support surface 8 of the outer sleeve 4 by means of a nut 9' with a support surface 7. The nut 9 is tightened on the coupling element 5 by means of the screw thread 11 and 10. A support ring 4.1 is integrated into the outer sleeve 4, and the support surface 8 is arranged on said support ring. In this case the coupling cover 5 has an external thread 11.

FIGS. 6 and 7 are important for sleeve designs with thicker walls in particular.

The invention claimed is:

1. Dental hand piece, comprising:
a housing and
a drive train with a coupling element for a drive,
wherein the housing radially surrounds the drive train, and
wherein the housing has a first housing end at a coupling region of the dental hand piece and a second housing end at a. head region of the dental hand piece and wherein the housing is held on the drive train on the first housing end and on the second housing end,
wherein on the second housing end, the housing is braced rigidly against the drive train,
wherein on the first housing end, there are no rigid connections between the housing and the coupling element, and a coupling cover is attached to the coupling element by screws which are distributed over the periphery of the coupling cover and which press the coupling cover against the coupling element,
wherein the coupling cover and the coupling element are not directly connected to the housing,
wherein between the first housing end and the coupling element there is arranged a decoupling element, which is strictly springy or springy and damping in an axial direction, and that the housing is braced with respect to the coupling element in the axial direction by means of the decoupling element,
wherein, the dental handpiece has a stop in the coupling region that is comprised of the coupling cover, decoupling element, and a support ring which receives the housing at the first housing end in the axial direction in a strictly springy or springy and damping manner, and is configured to prevent said rigid connections between the housing and the coupling element at the first housing end, by the decoupling element being disposed between a first axial support surface of the support ring that is connected to the housing and a second axial support surface that is located on the coupling cover which is attached to the coupling element, such that vibrations that are introduced by a head assembly are damped by the decoupling element in the coupling region, and
wherein the decoupling element is pressed in the axial direction against the first or second support surface, which is at least inclined in a portion thereof.

2. Dental hand piece according to claim 1, wherein the drive train comprises the head assembly and neck assembly, wherein the head assembly is angled with respect to the coupling element and that the head assembly comprises a tool axis, which in turn is angled with respect to the head assembly, wherein the coupling element is permanently connected to the head assembly by means of a U-bolt, and that the housing is rigidly braced. against a stop of the head assembly.

3. Dental hand piece according to claim 1, wherein the first or second axial support surface is perpendicular to the axial direction.

4. Dental hand piece according to claim 1, wherein the decoupling element is formed as a one piece with the support ring and with the coupling cover.

5. Dental hand piece according to claim 1, wherein a shape of the first axial support surface and the second axial support surface form a receptacle for containing the decoupling element, and wherein the first axial support surface and the second axial support surface are rounded surfaces, vertical surfaces having a bevel, bevel surfaces or axial surfaces.

6. Dental hand piece according to claim 1, wherein the decoupling element is elastic.

7. Dental hand piece according to claim 1, wherein the decoupling element is clamped on the coupling cover by a nut.

8. Dental hand piece according to claim 1, wherein an elastic radial spacer is disposed between the coupling element and the housing to further prevent the coupling element from coming into contact with the housing.

9. Dental handpiece according to claim 1, wherein the coupling cover is removable from the coupling element.

10. Dental handpiece according to claim 1, wherein the support ring is integrated into the housing.

* * * * *